United States Patent [19]

Tanimoto

[11] Patent Number: 5,911,775
[45] Date of Patent: *Jun. 15, 1999

[54] RETURN POINT ROUTE SEARCHING FOR VEHICLE NAVIGATION

[75] Inventor: Satoshi Tanimoto, Irvine, Calif.

[73] Assignee: Alpine Electronics, Inc., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/727,070

[22] Filed: Oct. 8, 1996

[51] Int. Cl.$^6$ .................................................. G06F 165/00
[52] U.S. Cl. ........................ 701/210; 701/209; 701/211; 340/988
[58] Field of Search ..................................... 701/200, 201, 701/202, 207, 208, 209, 210, 211; 340/990, 988, 995

[56] References Cited

U.S. PATENT DOCUMENTS 4,926,336  5/1990  Yamada ................................. 701/202
5,270,937  12/1993  Link et al. ............................ 701/209
5,414,630  5/1995  Oshizawa et al. ..................... 701/211
5,592,382  1/1997  Colley .................................. 701/207
5,652,706  7/1997  Morimoto et al. ..................... 701/210
5,675,492  10/1997  Tsuyuki ................................ 701/211
5,684,696  11/1997  Rao et al. ............................. 701/25

Primary Examiner—Jacques H. Louis-Jacques
Assistant Examiner—Gertrude Arthur
Attorney, Agent, or Firm—Brinks Hofer Gilson & Lione

[57] ABSTRACT

A vehicle navigation system copes with the situation when the vehicle deviates from a guided route (is off-route) and it is desired to reach the destination efficiently, i.e. with the least travel distance. The system determines the most efficient route to return to the guided route by analyzing the shortest distance between the current vehicle position and an unpassed road intersection on the original guided route, by searching for unpassed intersections on the original guided route within a particular radius of the current off-route vehicle position. The vehicle speed and heading angle are also used to determine the search radius, to find the shortest return route to the original guided route.

11 Claims, 4 Drawing Sheets

RETURN POINT ROUTE SEARCHING FOR VEHICLE NAVIGATION

BACKGROUND OF THE INVENTION

1. Field of the Invention

This invention relates to vehicle navigation systems and especially to the route guidance portion of such systems.

2. Description of the Related Art

Vehicle navigation systems are well known; see Yamada, U.S. Pat. No. 4,926,336 incorporated herein by reference disclosing a route searching system using a database describing road information including road intersections. See also Link et al. U.S. Pat. No. 5,270,937, incorporated herein by reference, disclosing a vehicle navigation/position system which searches road segments stored in a road map data memory for determining vehicle position in respect to road map coordinates.

The problem addressed by the present invention occurs e.g. when a vehicle navigation system is in an automatic route-searching mode. As shown in FIG. 1, the optimum route (the guided route NVRT) found by the system is continuously compared to the actual route being travelled by the vehicle. If there is a deviation from the guided route NVRT, the car is regarded to be off the guided route NVRT (i.e. on an "off-route" OFT). FIG. 1 shows a small portion of a road network which is stored in the database and which is also referred to as a set of map data. The database is conventionally stored as a series of road segments connecting nodes. The nodes are typically intersections of two road segments, but may be where a road segment terminates, for instance at a political or other boundary. In FIG. 1 the guided route NVRT is from the starting point node STP along the road segments which include nodes PT1 and RP1 to RP2 and ending in destination node DSP.

Of course it is to be understood that the route guidance of the system only provides instructions to the driver; the driver is by no means constrained to drive only along the guided route. For instance, the driver may be confused at a particular intersection by inadequate instructions from the system, or forced to detour by road conditions, and hence deviates from the guided route NVRT. In this case it is desirable for the system to guide him back to the guided (intended) route NVRT so that he may reach his destination DSP.

When an off-route condition is detected, and if the navigation system is in the conventional automatic route-searching mode, the system immediately searches for a node PT1 (entry point) which is an "unpassed" node on the guided route NVRT, to which the "slant distance" (a straight line in terms of latitude and longitude co-ordinates) from the present detected actual vehicle position Pc is the shortest distance (l1), searches for a route to navigate the vehicle to a return point RP1 on the original guided route NVRT from the present vehicle position Pc, and guides the vehicle according to the searched route to the return point RP1 which is on the original guided route NVRT.

Problematically, in conventional route-searching, the system searches the route from both the vehicle position Pc and the return point RP1 and finds a route from the current vehicle position Pc to the return point RP1, for example, the route Pc→CP1→RP1. In this case, since the return point RP1 is on the original guided route NVRT, the new guided route to the destination DSP (after recalculation of the guided route) is Pc→CP1→RP1→DSP. However, when the guided route is a winding route as shown, a route via a node close to the return point node PT1 to which the slant distance from the vehicle position Pc is the shortest, is not necessarily the shortest route to the destination DSP. Namely in FIG. 1, the route Pc→CP2→RP2→DSP is shorter than the route Pc→CP1→RP1→DSP. However, the conventional system will not find this shorter route.

The same problem occurs in the conventional non-automatic route-searching mode of the system. The system determines a return point when the driver commands it to search for a new route for navigating the vehicle from the off-route vehicle position Pc to the return point RP1, and guides the vehicle to the return point RP1, and the system guides the vehicle according to the searched route to the guided route. This would occur when the driver for instance realizes he has departed from the original guided route NVRT, and commands the system to search for a new route to the destination.

SUMMARY

In accordance with the present invention, a navigation system guides the vehicle back to a return point along the original guided route by minimizing the distance travelled to the destination, by a route that is searched after the vehicle is determined to have departed from the guided route.

In searching for an entry point after going off-route, the system expands the searching range beyond the slant distance and thereby finds a node (intersection) closer to the destination as the entry point. This enhances the possibility that the newly searched route is the shortest route to the destination, and the searched route can thereby effectively be used by the driver.

DETAILED DESCRIPTION

Figure 1:
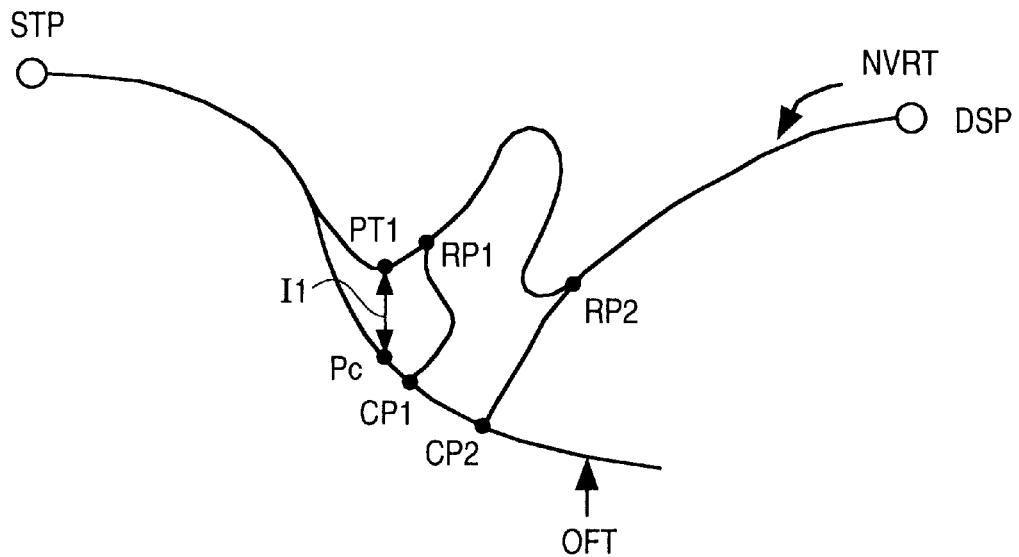
FIG. 1 shows the problem of route guidance from off-route to which the present invention is directed.
Figure 2:
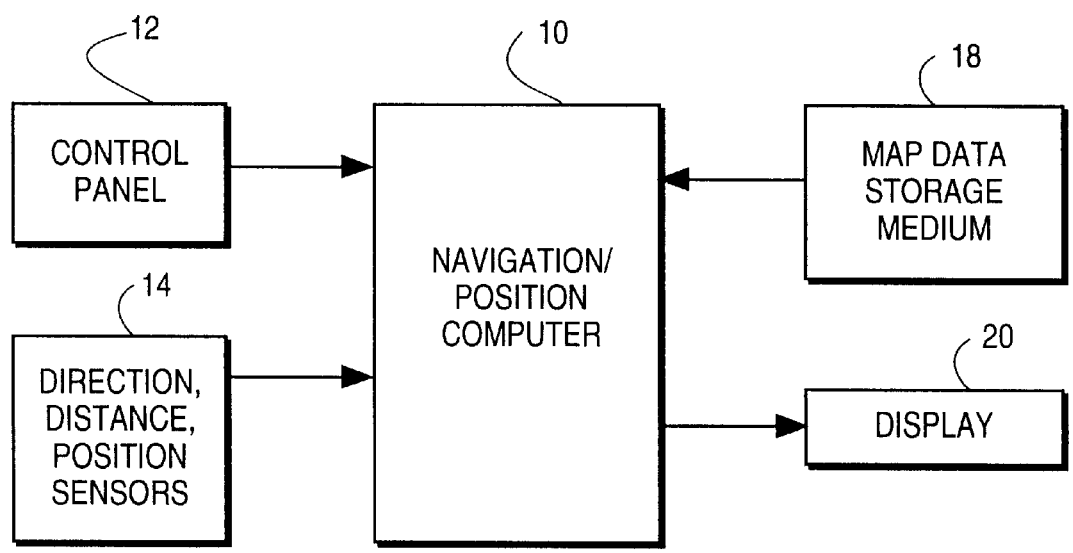
FIG. 2 shows in a block diagram a navigation system in accordance with the prior art and this invention.

FIG. 2 illustrates a block diagram of a vehicle navigation system in accordance with this invention and of the type shown for instance in Link, et al. U.S. Pat. No. 5,270,937. It is understood that such navigation systems have two main and interrelated functions; the first function is to display to the user a map of the present vehicle location, and the second function is to provide guidance on a guided route from a starting point to a destination. The second function is generally referred to as route guidance or selection. A route is typically optimized for one of various parameters, for instance minimum travel time, minimum travel distance, maximum use of freeways, or other parameters pertaining to movement of a vehicle on a road network.

The most important element of FIG. 2 is the navigation/position computer 10 which is for instance a microprocessor or microcontroller and associated circuitry. Computer 10 is controlled by a user control 12 (a control panel or remote control) which is for instance a keypad to be activated by the user for various system control functions. Navigation/position computer 10 receives input signals from a variety of direction, distance and position sensors 14 which indicate these parameters in terms of the current vehicle travel and location. For instance sensors 14 may include the vehicle speedometer, a gyrocompass, and/or a GPS (global positioning system) for determining the vehicle direction and current position. Map data storage medium 18 is e.g. a hard disk or a CD ROM operating on a suitable drive and which stores the map database for a particular area in which the vehicle is travelling. The map database is commercially available and organized as described above. Such databases are node (intersection) based or road segment based; the present invention is compatible with both types. Display 20 is for instance a small CRT or LCD type visual display driven by computer 10 which both indicates the current vehicle position using the map data supplied by map data storage medium 18 and displays guidance information. Display 20 may include (or be) an audible announcing capability.

The navigation/position computer 10 operates by means of a computer program, e.g. computer software, resident therein and executed as a series of instructions by the microprocessor and/or microcontroller which is a part of computer 10. It is to be appreciated that the method and apparatus in accordance with this invention are embodied in such computer software. While the present disclosure does not include the actual computer software code, such code can be written in light of this disclosure by one of ordinary skill in the art, and in an actual navigation system would be in the form of a computer program which is stored in a computer-readable memory such as a random access memory, a read only memory, a hard disk drive, floppy disk, or an optical disk conventionally associated with computer 10.

It is to be appreciated that the system of FIG. 2 is largely conventional. Thus the present disclosure is only directed to the process of returning to a guided route from off-route, and in other aspects the present system is conventional.

Figure 3:
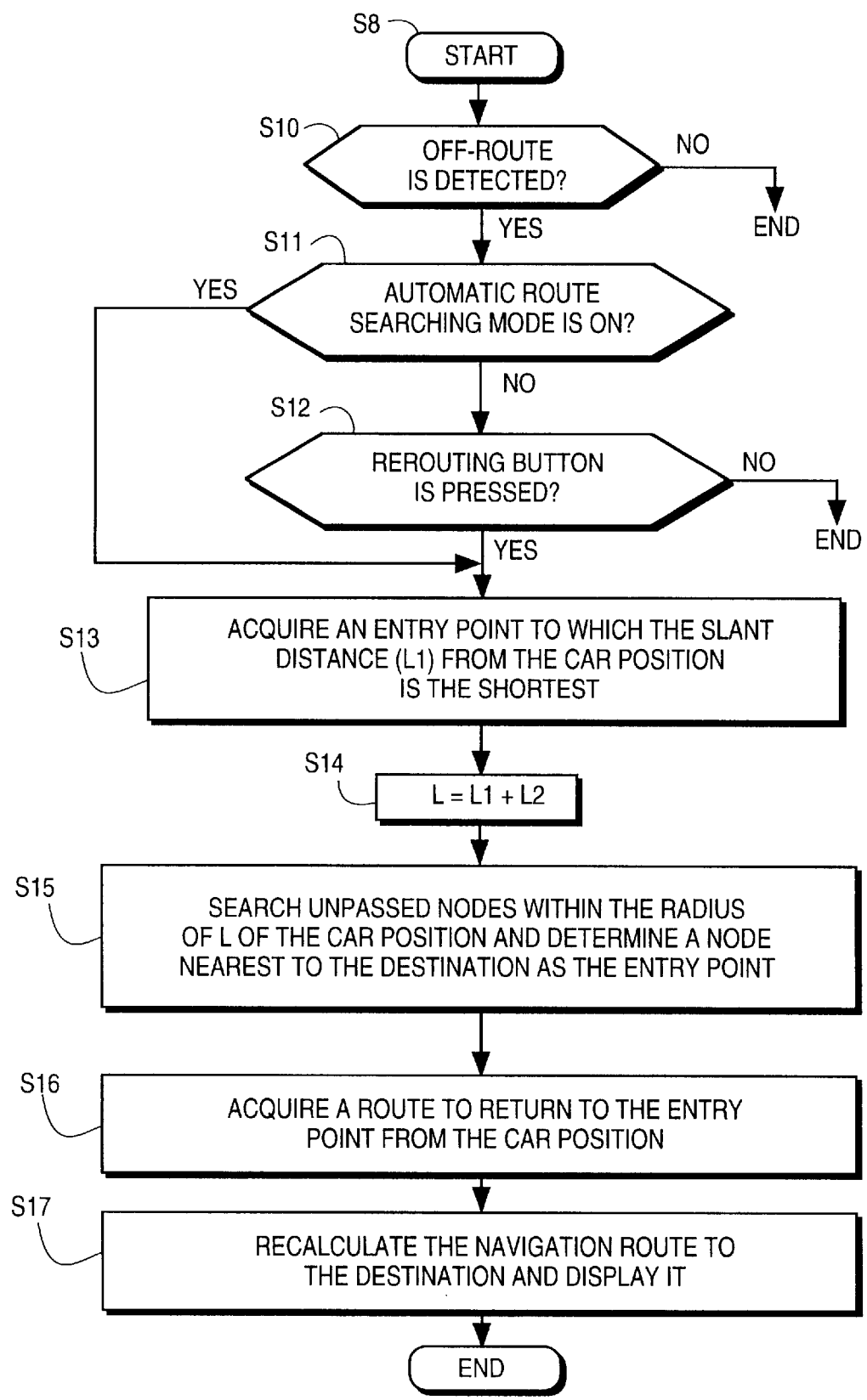
FIG. 3 shows a flowchart of a computer program in accordance with this invention for route guidance.
Figure 4:
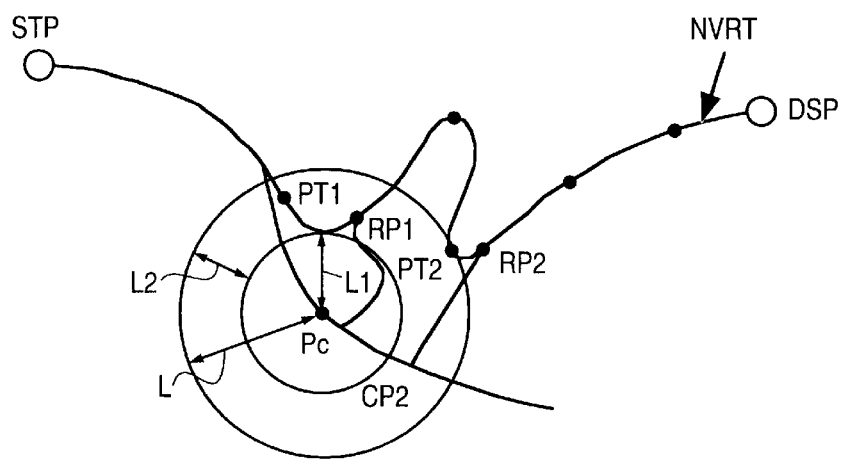
FIG. 4 shows diagrammatically the method shown in FIG. 3.

FIG. 3 is a flowchart showing off-route guidance according to the present invention as illustrated diagrammatically in FIG. 4. FIG. 3 therefore depicts a portion of the computer program (software) which is executed by the computer 10 of FIG. 2. One of ordinary skill in the art would easily be able to write the program code from a flowchart of FIG. 3. This computer code may be written in any one of a number of suitable computer programming languages.

The program of FIG. 3 is periodically invoked (at start step S8 in FIG. 3) whenever the vehicle is in conventional route guidance mode. When an off-route condition is detected (step S10) computer 10 performs a route determination starting in step S11. Detection of an off-route condition in step S10 is conventional. For instance, it can be via a comparison of the actual current vehicle position Pc to the nodes and road segments on the guided route NVRT of FIG. 4.

Next, when the automatic route-searching mode is invoked (step S11), or when in the non-automatic route searching mode (step S12) the driver gives the rerouting command e.g. the rerouting button on control unit 12 is pressed by the driver, the computer 10 (in step S13) acquires from the road data describing the guided route NVRT a road node (entry point) on route NVRT to which the slant distance L1 from the present vehicle position Pc is the shortest, for example node PT1 in FIG. 4. The slant distance is a straight line, calculated using the latitude and longitude map data for each node in the database.

Next, according to the equation: L=L1+L2 (See FIG. 4), search radius L is calculated (step S14). L2 is in one embodiment a predetermined fixed value, for example one mile. Next, computer 10 searches all nodes between vehicle position Pc and destination DSP on route NVRT, that are within the radius L of the current vehicle position Pc, obtains from the nodes found in this search that node nearest to the destination DSP, for example node PT2, and designates node PT2 as the entry point (step S15). The entry point is a node on the original guided route NVRT at a minimum distance (along the road network) between vehicle position Pc and the original guided route NVRT found within search radius L of location Pc.

Computer 10 next searches for routes from vehicle position Pc to node PT2 by the known Dijkestra exploration technique, and determines an optimum route, which is the shortest route in terms of e.g. distance or travel time. Computer 10 thereby acquires a recalculated route to return to the return point RP2 from the current vehicle position Pc, for example, route Pc→CP2→RP2. Note that the entry point PT2 is not on the actual recalculated (new) guided route, but is used to determine an intermediate result to find the new guided route. That is to say, the system determines that the route from CP2 to PT2 is via node RP2. Since return point RP2 is on the original guided route NVRT, there is no need to actually travel via PT2, and so the optimum route to the destination DSP is then determined to be Pc→CP2→RP2→DSP, which is the new (recalculated) guided route and is shown on the system display 20 (step S17). It is to be understood that the actual route selection and route optimizing algorithms are otherwise conventional and hence not disclosed herein in any further detail.

Figure 5:
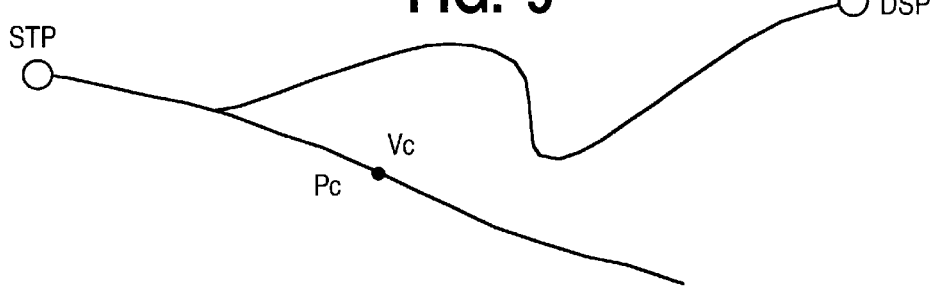
FIG. 5 shows diagrammatically travel speed in the off-route condition.
Figure 6:
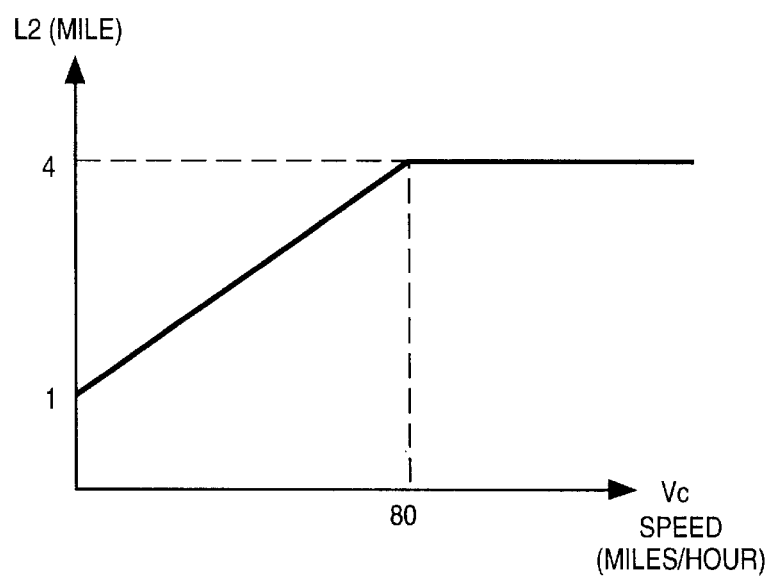
FIG. 6 shows diagrammatically the effect of determination of the parameter L2 as a function of travel speed.

In one embodiment, distance L2 is a fixed distance as described above. In a second embodiment, distance L2 changes dynamically. As shown in FIGS. 5 and 6, in this embodiment computer 10 responds to the vehicle speed Vc at location Pc as detected by sensors 14 (FIG. 5), and in response obtains distance L2 from a stored table ("look up table") of vehicle speed versus values of L2 as shown graphically in FIG. 6. Using this looked up value of L2, computer 10 then searches in step S15 for a node on the guided route NVRT closer to the destination DSP to be the entry point, thereby enhancing the possibility of finding a shorter route to the destination DSP for a particular speed.

Figure 7:
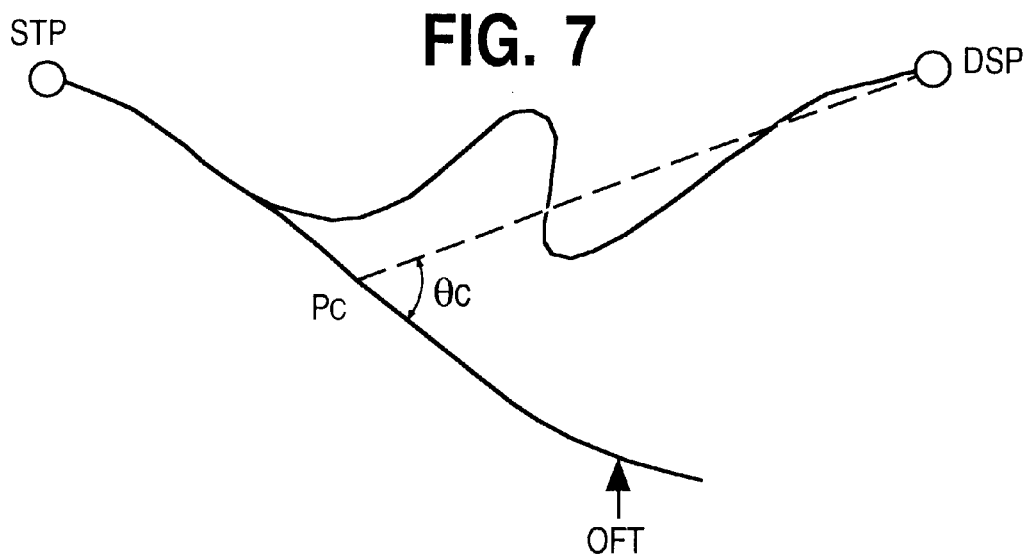
FIG. 7 shows diagrammatically the effect of vehicle heading angle in the off-route condition.
Figure 8:
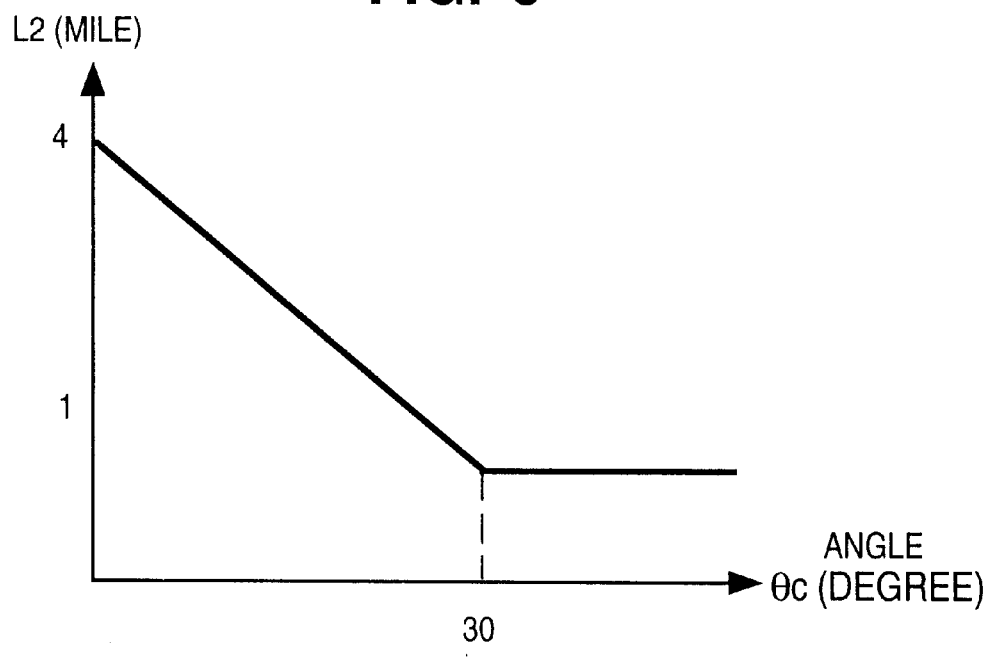
FIG. 8 shows diagrammatically determination of the parameter L2 as a function of vehicle heading angle.

As shown in FIGS. 7 and 8, in another embodiment computer 10 determines a vehicle heading angle $\theta c$, i.e. the angle between the current vehicle heading direction at the current vehicle position Pc on the off-route OFT and the direction to the destination DSP, and then obtains L2 from a stored table of values of $\theta c$ versus L2 as shown graphically in FIG. 8. Thus when the angle $\theta c$ is large, computer 10 finds an entry point whereby the vehicle can return sooner to the guided route NVRT. On the other hand, when the angle $\theta c$ is small indicating that the vehicle heading direction on the off-route OFT is closer to the direction towards the destination DSP, the computer can find an entry point near to the destination DSP, also giving the shortest route. It is to be understood that the particular functions of Vc and $\theta c$ shown here are only illustrations.

Further, in yet another embodiment, by applying a weighting factor to both the vehicle speed Vc and the heading angle $\theta c$, computer 10 calculates a composite value of L2: $\alpha Vc+$ $\beta\theta c = L2$, where $\alpha$ and $\beta$ are weighting constants, where $\alpha$, $\beta < 1$ and $\alpha$, $\beta$ may be set arbitrarily or empirically.

This disclosure is illustrative and not limiting; further modifications will be apparent to one skilled in the art in light of this disclosure and are intended to fall within the scope of the appended claims.

I claim:

1. A method of guiding a vehicle along a guided route to a destination, comprising the steps of:

determining a guided route from a road network stored as a series of road segments connecting nodes;

determining a current vehicle position;

determining if the current vehicle position is off the guided route;

determining a straight line distance from the current vehicle position off the guided route to a nearest node on the guided route to the current vehicle position;

searching for a node on the guided route not yet traversed by the vehicle, and within a particular distance of the current vehicle position, the particular distance being greater than the straight line distance; and determining a revised guided route to the destination via the searched-for node where the revised guided route is selected from the stored road network.

2. The method of claim 1, wherein the particular distance is the straight line distance plus a constant distance.

3. The method of claim 1 where the particular distance is the straight line distance plus a distance that is a function of a current speed of the vehicle.

4. The method of claim 1, where the particular distance is the straight line distance plus a distance that is a function of a current heading of the vehicle relative to the destination.

5. The method of claim 1, where the particular distance is the straight line distance plus a distance that is a function of a weighted average of a current speed and a current heading of the vehicle relative to the destination.

6. The method of claim 1, wherein the step of searching includes searching for an optimum route from the current vehicle position to the destination via the searched-for node.

7. A vehicular navigation system for finding a guided route on a road network, comprising:

means for determining a guided route from a road network stored as a series of road segments connecting nodes;

means for determining a current vehicle position;

means for deter mining if the current vehicle position is off the guided route;

means for determining a straight line distance from the current vehicle position off the guided route to a nearest node on the guided route to the current vehicle position;

means for searching for a node on the guided route not yet traversed by the vehicle, and within a particular distance of the current vehicle position, the particular distance being greater than the straight line distance; and means for determining a revised guided route to the destination via the searched-for node where the revised guided route is selected from the stored road network.

8. The system of claim 7, wherein the particular distance is the straight line distance plus a constant distance.

9. The system of claim 7 where the particular distance is the straight line distance plus a distance that is a function of a current speed of the vehicle.

10. The system of claim 7, where the particular distance is the straight line distance plus a distance that is a function of a current heading of the vehicle relative to the destination.

11. The system of claim 7, wherein the particular distance is the straight line distance plus a distance that is a function of a weighted average of a current speed and a current heading relative to the destination of the vehicle.

* * * * *